United States Patent [19]
Catherino

[11] 3,870,562
[45] Mar. 11, 1974

[54] USE OF Ni(OH)₂ IN PRESSED PLATE ELECTRODES

[75] Inventor: Henry A. Catherino, Gainesville, Fla.

[73] Assignee: General Electric Company, Owensboro, Ky.

[22] Filed: June 17, 1974

[21] Appl. No.: 480,017

[52] U.S. Cl. .................................... 136/24
[51] Int. Cl. .......................... H01m 43/04
[58] Field of Search ............... 136/24; 75/0.5

[56] References Cited
UNITED STATES PATENTS

| | | | |
|---|---|---|---|
| 2,934,581 | 4/1960 | Dassler | 136/24 X |
| 2,988,585 | 6/1961 | Peters | 136/24 |
| 3,023,260 | 2/1962 | Coler et al. | 136/24 |
| 3,060,254 | 10/1962 | Urry | 136/24 |
| 3,384,513 | 5/1968 | McHenry | 136/24 |
| 3,706,601 | 12/1972 | Strier et al. | 136/24 X |

Primary Examiner—John H. Mack
Assistant Examiner—C. F. Lefevour
Attorney, Agent, or Firm—D. A. Dearing; F. L. Neuhauser

[57] ABSTRACT

A rechargeable cell having a cadmium negative electrode comprising a mixture of cadmium metal powder, cadmium oxide powder and nickel hydroxide mixed with a binder and applied to a foraminous substrate, preferably conductive. The cell has a higher energy density and improved anti-fading properties at ambient and higher temperatures.

10 Claims, 5 Drawing Figures

USE OF Ni(OH)₂ IN PRESSED PLATE ELECTRODES

CROSS-REFERENCE TO RELATED APPLICATION

This application is related to U.S. patent application Ser. No. 275,086 of Henry A. Catherino filed on July 25, 1972, and assigned to the assignee of the invention herein, the disclosure of which is hereby incorporated by reference herein.

BACKGROUND OF THE INVENTION

This invention relates to rechargeable cells and more particularly rechargeable cells having cadmium negative electrodes.

Cadmium electrodes for electrochemical cells have been produced in a number of ways, including application of other cadmium salts to a substrate followed by electrochemical conversion to metallic cadmium as well as by direct application of cadmium-cadmium oxide paste to a substrate. In actual practice, it has been found necessary to charge and discharge the electrode to transform these substances into usable and electrochemically reactive forms before the electrode can be used in the cell to obtain maximum charging capacity in relationship to the amount of cadmium actually present. This is known in the art as the "formation process."

It is also known to manufacture cadmium electrodes using, as a starting material, only cadmium oxide. In such a process, however, it is usually desirable to reduce some of the cadmium oxide to metallic cadmium before introduction of the electrode into a cell to provide excess dischargeable capacity in the negative electrode to counter what is commonly called "fading." While the phenomenon of fading is not completely understood, apparently, during the life of the cell, some of the active material of the negative electrode no longer is easily oxidized. By providing excess charged capacity in a negative electrode— with respect to the charge capacity in the positive electrode— such losses can be compensated for.

The earlier Catherino application discloses a rechargeable cell having a cadmium negative electrode comprising stabilized cadmium metal particles having an average particle size of about 3–12 microns and preferably containing at least about 1% by weight of cadmium oxide to inhibit oxidation of the metallic powder and further mixed with cadmium oxide powder and a binder. This mixture is spread or pressed on a substrate by appropriate means to form a "pressed" or "pasted" electrode having enhanced anti-fading properties. Pressed plate or electrode in this context means a plate or electrode formed by compressing a mixture including an active material and binder on a substrate.

It was found that cadmium metal powder having this particular shape and size yielded superior results because of its peculiar structure which apparently gave it a more stable construction for the subsequent steps of constructing an electrode as fully explained in the earlier Catherino application. However, it was found that the pasted electrode construction of the earlier Catherino application failed to give the desired anti-fading properties at elevated temperatures (120°F) such as those achievable with a sintered electrode construction. A sintered electrode is constructed by sintering powder, usually nickel, on substrate to form a porous plaque, which plaque is then impregnated with active material salts.

It is, therefore, an object of this invention to provide an improved rechargeable cell comprising a pasted negative cadmium electrode which has enhanced anti-fading properties.

Other objects and features of this invention will be apparent from the following description and accompanying claims.

SUMMARY OF THE INVENTION

In accordance with the invention, a rechargeable cell having an improved cadmium negative electrode having enhanced anti-fading properties is provided comprising stabilized cadmium metal particles having an average particle size of about 3–12 microns and preferably containing at least 1% by weight of cadmium oxide to inhibit oxidation of the metallic powder, nickel hydroxide powder, cadmium oxide powder, and a binder. This mixture is spread or pressed on a substrate by appropriate means to form a pressed cadmium electrode.

The invention will be better understood from the following description taken in connection with the accompanying drawings.

DESCRIPTION OF THE PREFERRED EMBODIMENT

Figure 1:
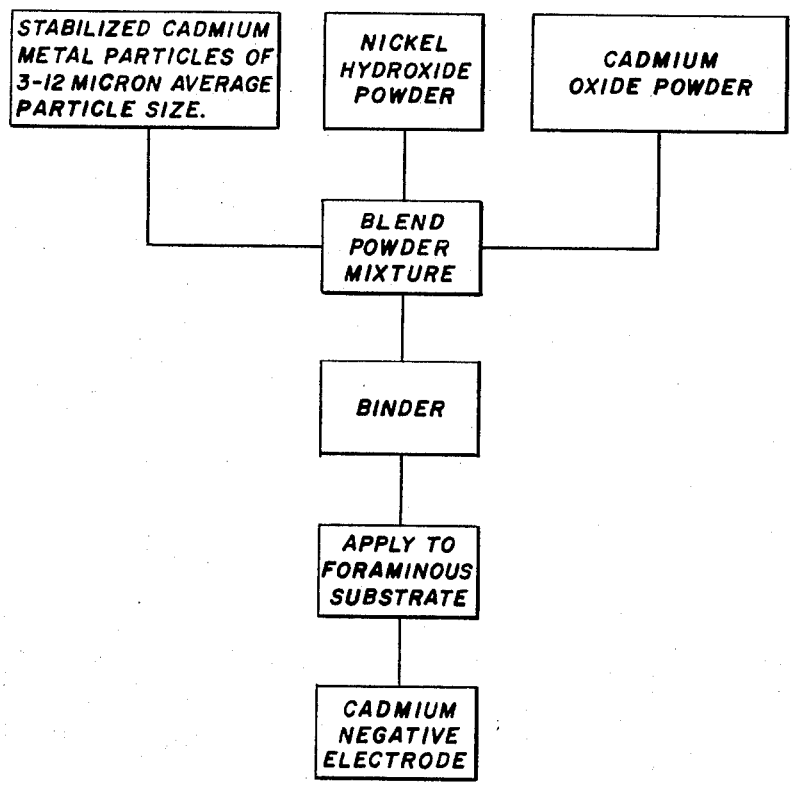
FIG. 1 is a flow sheet of the invention.

In accordance with the invention, an improved rechargeable cell is produced by constructing a negative cadmium electrode comprising a mixture of nickel hydroxide, cadmium oxide, powdered cadmium metal in a form which is not readily oxidizable in air yet can be made electrochemically active, and a binder, which mixture is then applied to a substrate.

The cadmium metal powder used to produce the electrode of this invention must be carefully prepared to an average particle size of about 3–12 microns, preferably 5–10 microns, and stabilized with at least 1% cadmium oxide to prevent premature oxidation of the cadmium metal particles before subsequent mixing with the cadmium oxide particles. It is further preferred that the particles be spherically shaped as this has been found to produce, in the preferred particle size range, an electrochemically active cadmium metal particle which is not easily oxidized in air. It should be noted that cadmium metal powder, if finally divided into very small particle size, provides the requisite electrochemical reactivity yet is easily oxidized by air (pyrophoric) and therefore very difficult to work with. Larger particle sizes, while substantially eliminating the possibility of this inadvertent oxidation, greatly reduces the electrochemical reactivity of the particle. Metallic cadmium powder in the preferred particle size range, however, has been found to be sufficiently small to produce the desired electrochemical reactivity without undue risks of premature oxidation while producing the electrode, particularly, as will be described below, when stabilized with a minor amount of cadmium oxide. The process for forming and the resulting characteristic structure of such cadmium metal powder is described in detail in the aforesaid application Ser. No. 275,086 filed July 25, 1972, of Catherino, the disclosure of which has been incorporated by reference herein. It has been found that cadmium metal powder, in the particle size range desired in the practice of the invention, can be produced by condensing vaporized cadmium metal in the presence of a controlled amount of oxygen. This provides a mixture of metallic cadmium in the form of spherically shaped particles having an average particle size of about 3–12 microns and a minor amount of about 1–6% by weight cadmium oxide.

In this specification, reference is made to the shape of the particles of cadmium metal as spherical. This term is to be understood to mean that the particles largely appear as spheres under microscopic examination. Some of the particles, however, appear as spheres with a flattened side and, therefore, may be termed spheroidal, that is, a body that is almost, but not, a perfect sphere.

While it is not entirely understood why the cadmium metal powder in the particle shape and size recited yields superior results, nor why the presence of a small amount of oxygen in the formation process is necessary, it is very likely that the oxygen (1) reacts with the very fine cadmium metal particles, that is, particles below the desired size, and particularly those of submicron size; and (2) the larger particles have their surfaces protected from further oxidation by a thin, passivating layer of cadmium oxide. Thus, the resulting powder is more stable in air during the subsequent steps of constructing an electrode.

The cadmium metal powder described above is subsequently mixed in the desired ratio with cadmium oxide powder preferably having an average particle size of about 1 micron to produce, in the finished electrode, a mixture providing the desired amount of precharged, electrochemically active, cadmium metal, as well as the desired amount of chargeable capacity, that is, cadmium oxide. The amount of electrochemically reactive cadmium oxide will be the equivalent of the desired capacity of the negative electrode, that is, in principle equal to the capacity of the positive electrode with which it will be assembled in the finished cell. In practice, about 80%, by weight, of the cadmium oxide used is electrochemically utilized. For example, in a 1.0 ampere-hour capacity cell, normally 2.62 grams of cadmium oxide could be used in the production of the negative electrode along with 0.467 grams of metallic cadmium powder to produce the required amount of precharge. The amount of cadmium powder used is variable and determined by the application. The minimum level is determined as the level at which no substantial capacity loss is observed during the early charge-discharge cycles of the assembled cell. A safe level of precharge is about 15% by total weight of the mixed ingredients, but may vary depending on the cell application.

In accordance with this invention, the powder mixture is further mixed with about 1%, by total weight of the powder mixture, of nickel hydroxide powder. It has been discovered that the addition of this minor amount of $Ni(OH)_2$ gives rise to enhanced anti-fading properties at elevated temperatures for cells incorporating such cadmium electrodes. Further, it has been discovered that, by the addition of $Ni(OH)_2$, the amount of cadmium metal particles required for optimum performance is reduced to approximately 15% by weight of the total weight of the mixture, this being about one-third of the preferred amount for a 1.0 amp-hour capacity cell disclosed in the cross-referenced Catherino application. While the mechanism by which these results occur is not completely understood, it is thought that the addition of the nickel hydroxide apparently prevents the cadmium metal particles from agglomerating during high temperature cycling; and if this is so, it would thus explain the unexpected enhancement of the anti-fading properties occurring during high temperature cycling as well as the significant reduction in the amount of cadmium metal "precharge" required without sacrificing the enhanced anti-fading properties.

The resulting powder mixture is then mixed with about 1%, by total weight of the mixture, of an appropriate binder prior to application to a substrate. Any suitable binder may be used such as, for example, solid powder binders such as polyvinyl alcohol or fluorocarbon binders, in which case the mixture is pressed onto the substrate. Dispersable or dissolvable binders may also be used. Examples of dissolvable binders include polystyrene, polyvinyl pyrolidone, and polymethylmethacrylde. The binder material preferably should be alkali-resistant when the electrode is to be used in an alkali electrolyte such as KOH.

In a preferred embodiment, the powder mixture is blended with de-ionized water containing an aqueous fluorocarbon dispersion which, in a readily available commercial dispersion, comprises about 50% solids in a ratio of 99 parts by weight of the total powder mixture to 2 parts of the fluorocarbon dispersion. This ratio may be adjusted slightly depending upon (1) the amount of dispersed fluorocarbon which is usually about 50% by weight of the dispersion, and (2) the desired physical properties of the resulting coagulated mass. The production of an electrode using an unsintered fluorocarbon binder is described in more detail in Rampel U.S. Pat. No. 3,630,781 issued Dec. 28, 1971, cross-reference to which is hereby made. The amount of water used should be sufficient to cover the powder. The actual amount is widely variable between a slurry and a submerged powder. The mass is coagulated by heating to about 170°F. but below the sintering temperature of the fluorocarbon binder, and kneading the mass until it coagulates. A preferred variation is to (1) begin the process with water preheated to 170°F.; (2) add the dispersed fluorocarbon mixture; and (3) blend the powder into the water-fluorocarbon mixture.

The resulting coagulated mass is pressed, preferably by the use of rollers, into and over a foraminous substrate which is, in a preferred embodiment, a metal screen such as nickel metal screen. The screen containing the paste is again passed through a set of rollers to further compress and to reduce the total thickness of the resulting electrode to, for example in one embodiment, about 19 mils. The minimum thickness is, of course, the thickness of the screen or substrate itself. The maximum thickness of the electrode is determined both by the mechanical handling of the resultant electrode and the electrochemical requirements of the particular cell into which the electrode is to be assembled. After the paste has been applied, the edges are trimmed and the pressed plate is passed through an oven to remove the water from the plate.

Figure 2:
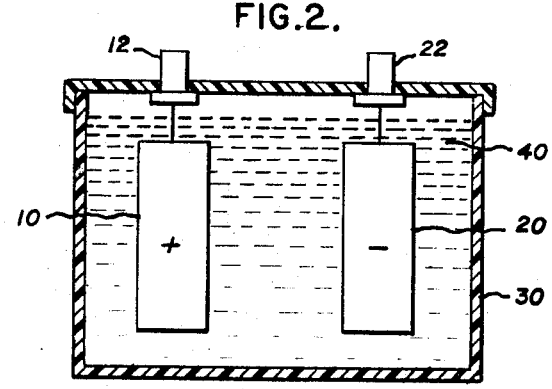
FIG. 2 is an axial cross-sectional view of a cell constructed in accordance with the invention.

The improved negative cadmium electrode is assembled into a cell such as generally illustrated in FIG. 2 with a positive electrode having uncharged active positive material in an amount, in terms of coulombic capacity, not exceeding the amount of uncharged negative material, i.e., cadmium oxide. Preferably, the amount of active positive material is less than the amount of cadmium oxide. Examples of positive electrode materials which can be used with the cadmium negative electrode include nickel, mercury, and silver.

The positive and negative electrode may be pre-assembled as a flat pack or in coiled form with appropriate separators therebetween. As shown in FIG. 2, positive electrode 10 and negative electrode 20 are inserted into an alkali electrolyte resistant casing 30, the electrodes are electrically connected respectively to terminals 12 and 22 on casing 30, an electrolyte 40 such as KOH added, and the cell is sealed.

After assembly and sealing, the cell is charged at a convenient rate to full capacity. The cell may then be discharged, for convenience in shipping, preferably through a low resistance resistor, for example about 1–5 ohms.

To further illustrate the invention, and in particular the effect of different levels of $Ni(OH)_2$ on cell performance, a plurality of 1.0 amp-hour test cells was constructed with each of the mixtures as set forth in Table I. Each mixture was made by mixing $Ni(OH)_2$, CdO and Cd in powder form with Cd powder in the form of spherical metal particles of 5–10 micron average particle size. Each powder mixture was then mixed with 2% by weight of Teflon 30, an aqueous polytetrafluoroethylene (PTFE) dispersion containing about 50% solids. The slurry was heated to 170°F. to break the dispersion and coagulate the slurry into a paste. The paste was then applied to a 1.25 inches wide 20×20 nickel wire mesh to which metal tabs had been previously welded. The paste was applied and pressed to a thickness of about 19 mils. After this, the substrate edges were trimmed smooth. Next, the plate was dried and then cut to a length of 8.4 inches.

Table I

| Mixture No. | Paste Components (Percent by Weight) | | | |
|---|---|---|---|---|
| | $Ni(OH)_2$ | CdO | Cd | PTFE |
| 1 | 0.00 | 84.00 | 15.00 | 1.00 |
| 2 | 0.01 | 83.00 | 15.00 | 1.00 |
| 3 | 0.10 | 83.00 | 15.00 | 1.00 |
| 4 | 0.50 | 83.50 | 15.00 | 1.00 |
| 5 | 1.00 | 83.00 | 15.00 | 1.00 |
| 6 | 3.00 | 81.00 | 15.00 | 1.00 |
| 7 | 5.00 | 79.00 | 15.00 | 1.00 |

The resulting electrodes were then wound, together with separators, with a 6.7 inches long conventional nickel electrode to form cell rolls. The rolls were placed in standard sub-C cell casings with the tabs attached to the terminals, KOH electrolyte was added, and the cells were sealed.

Figure 3:
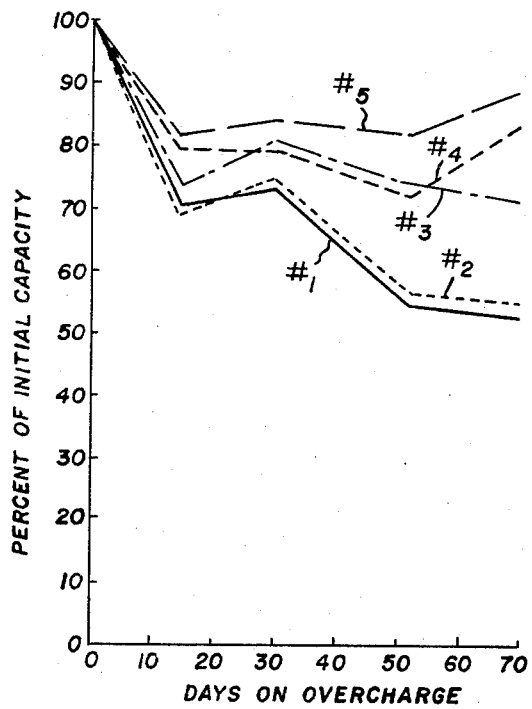
FIG. 3 is a graph showing the anti-fading properties at elevated temperatures of cells constructed in accordance with the invention relative to a control sample.
Figure 4:
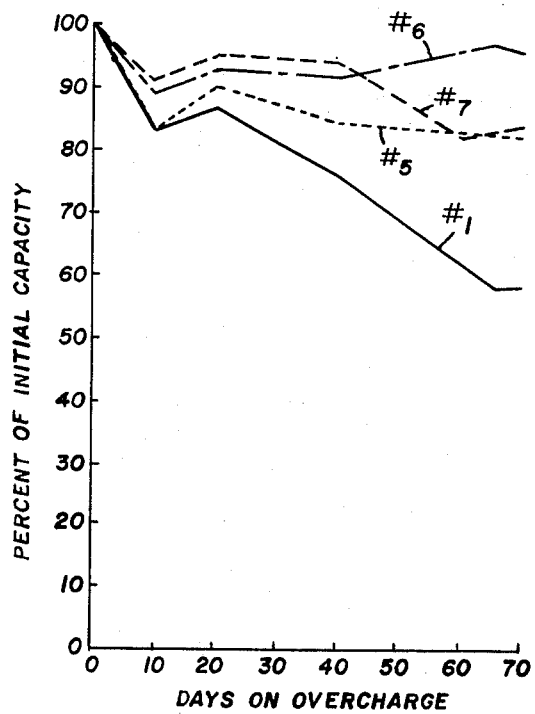
FIG. 4 is another graph showing the anti-fading properties at elevated temperatures of cells constructed in accordance with the invention relative to a control sample.

All cells were then charged at 120 Ma for 22 hours and the initial capacity of each plurality of cells was determined by selecting three cell samples from each plurality and discharging them at a rate of 2.4 amps to 1.0 volt. The average value of each three-cell sample was then assigned as the value for full (100%) capacity for the corresponding plurality of cells. Each plurality was then placed on continuous overcharge at 120 Ma at 120°F. Thereafter, samples of three cells each were periodically selected from each plurality and the capacity thereof was determined by discharging them as indicated above. The test data is shown in FIGS. 3 and 4 as a graph of the percentage of the initial capacity retained of the cells versus the number of days on overcharge, each data point being representative of the average capacity of the three cells tested on that particular day versus the number of days on overcharge. In FIG. 3, curves No. 1, No. 2, No. 3, No. 4, No. 5 represent the data taken for the cells having negative plate constructed from the like-enumerated mixture.

The test cells of curve No. 5 (1% $Ni(OH)_2$) have 85–90% capacity retained after 70 days on overcharge, whereas the test cells of curve No. 1 (0.0% $Ni(OH)_2$), after 70 days overcharge, have dropped to a capacity between 50–55%. Thus, it can be seen that this yields an approximately 35% greater retention of capacity by incorporating approximately 1% by weight of nickel hydroxide powder in the mixture used to form the pasted electrode.

In FIG. 4, similarly, curves No. 1, No. 5, No. 6, No. 7 represent cells which have negative plates constructed from the like-enumerated mixture. Curves No. 1 and No. 5 represent additional test samples for the values of 0.0% and 1% nickel hydroxide. As can be seen, they agree essentially with the data shown in FIG. 3. In curve No. 6 (3% $Ni(OH)_2$), the percent of initial capacity retained stays between 89% and 97.5%. The curve No. 7 (5% $Ni(OH)_2$) shows values for the average of the three cells tested at the 20th day and 40th day of overcharge of between 93% and 95% capacity retention. However, the last data point for this graph taken at the 65th day showing an average capacity of 83% is unexplained. This unexpected drop in capacity retention is not thought to invalidate the otherwise substantially uniform enhancement of capacity retention after long periods of overcharge at high temperatures. Again, as an example, the curves No. 1, No. 5 (FIG. 4) for 0.0% and 1.0% $Ni(OH)_2$, respectively, show a capacity retention enhancement of approximately 25%.

To further illustrate the invention, and in particular the preferred amount of cadmium metal powder which should be incorporated in cell constructed in accordance with the invention herein, a group of cells was constructed, following the same procedure described for the test cells described hereinabove, with each of the mixtures as set forth in Table II.

Table II

| Mixture No. | Paste Components (Percent by Weight) | | | |
|---|---|---|---|---|
| | $Ni(OH)_2$ | CdO | Cd | PTFE |
| 8 | 1.00 | 98.00 | 0.00 | 1.00 |
| 9 | 1.00 | 93.00 | 5.00 | 1.00 |
| 10 | 1.00 | 88.00 | 10.00 | 1.00 |
| 11 | 1.00 | 83.00 | 15.00 | 1.00 |
| 12 | 1.00 | 64.00 | 34.00 | 1.00 |

Figure 5:
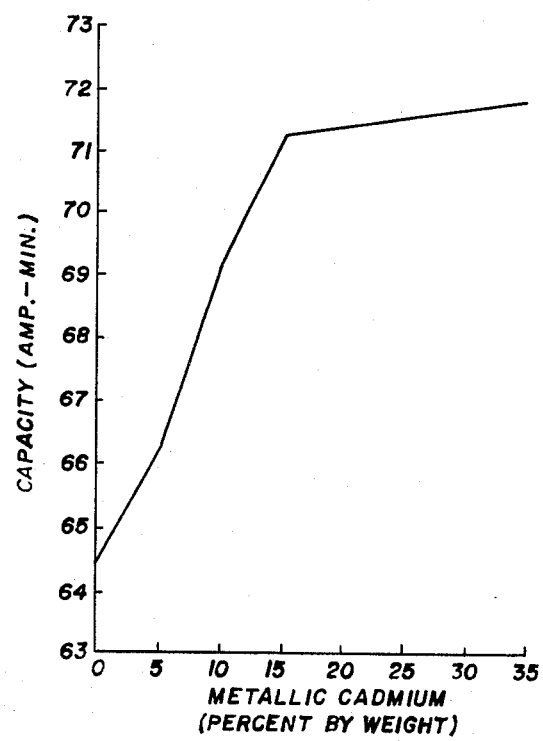
FIG. 5 is a graph showing, after cycling, the capacity as a function of percent by weight metallic cadmium (precharge) in the negative electrode for cells constructed in accordance with the invention.

All cells so constructed were then charged at room temperature at a 120 Ma rate for 22 hours and discharged at a 2.4 amperes to 0.0 volts for 7 cycles. The capacity of the respective groups of cells was then determined on the eighth cycle by selecting a three-cell sample from each group of cells and discharging them at a rate of 2.4 amps to 0.0 volts. The test data is shown in FIG. 5 as a graph of the capacity of the cells versus the percent by weight cadmium metal powder in the negative plate, each data point being representative of the average capacity of the three cells tested from a particular group. The curve in FIG. 5, as can be seen, rises sharply from a value of 65 amp.-minutes for mixture No. 8 (0.0%) to a value of 71.2 amp.-minutes capacity for mixture No. 11 (15%) and thereafter rises more slowly to a value of 71.8 amp.-minutes for mixture No. 12 (34%). Thus, it is seen that any value between 0 and 15 parts by weight cadmium metal powder yields a sharp increase in retained dischargeable capacity of cells which have been subjected to cycling. Accordingly, approximately 15% by weight cadmium metal powder is preferred, but the particular amount can be varied in accordance with the application required.

Thus, the invention provides a cell having enhanced anti-fading properties due to a novel cadmium electrode with metallic cadmium powder and nickel hydroxide powder therein.

It can be seen from the curves shown in FIGS. 3 and 4 that the degree of enhancement of anti-fading properties varies with the percentage by weight of nickel hydroxide powder. While preferred values have been indicated for the amount of cadmium metal powder and nickel hydroxide, many modifications may be made in these values. One such modification which will be apparent to those skilled in the art is the use of a paste mixture without Cd powder but with provision being made so as to allow the generation thereof within the cell thereby to create a precharge. It will further be apparent to those skilled in the art that, while not preferred, $Cd(OH)_2$ or a mixture of CdO and $Cd(OH)_2$ can be used as a starting material in lieu of CdO. This will be apparent because the CdO, during the mixing of the paste in accordance with the invention herein, undergoes a hydrolysis reaction to form $Cd(OH)_2$, and accordingly, the species which actually undergoes electrochemical reduction in the negative plate is $Cd(OH)_2$. It should be thus understood and it is the intention of the applicant that the appended claims cover all such modifications that fall within the true spirit and scope of this invention.

What I claim as new and desire to secure by Letters Patent of the United States is:

1. In a rechargeable cell having an alkali-electrolyte resistant container having at least one insulated terminal thereon, a positive electrode, an alkali electrolyte, and a cadmium pressed negative electrode, the improvement comprising said negative electrode comprising:
   a. substrate;
   b. a compressed mixture supported on said substrate, said mixture comprising:
      1. stabilized cadmium metal generally spherically shaped particles formed by condensing cadmium metal vapors in the presence of oxygen having an average particle size of about 3–12 microns;
      2. about 0.01–5% by weight nickel hydroxide powder;
      3. a cadmium compound powder selected from the group of CdO, $Cd(OH)_2$, and mixtures thereof;
      4. a binder.

2. The cell of claim 1 wherein said cadmium metal particles are stabilized with CdO.

3. A pressed cadmium negative electrode having a substrate, the improvement comprising a compressed mixture supported on said substrate, said mixture comprising:
   a. a cadmium compound powder selected from the group of CdO, $Cd(OH)_2$, and mixtures thereof;
   b. generally spherically shaped cadmium metal particles having an average particle formed by condensing cadmium metal vapors in the presence of oxygen size of 3–12 microns and stabilized with a minor amount of CdO, said cadmium metal particles comprising not more than 34% by weight of the powder mixture;
   c. about 0.01–5% by weight nickel hydroxide powder; and
   d. a binder.

4. The electrode of claim 3 wherein said cadmium compound has a particle size of about 1 micron and comprises about 60–98% by weight of the powder mixture.

5. The electrode of claim 3 wherein said binder comprises an unsintered fluorocarbon binder.

6. The electrode of claim 3 wherein said nickel hydroxide powder comprises about 0.1–5% by weight of the powder mixture.

7. An improved process for producing a cadmium negative electrode for a rechargeable cell having enhanced anti-fading properties comprising:
   a. providing generally spherically shaped particles of stabilized cadmium metal powder formed by condensing cadmium metal vapors in the presence of oxygen having an average particle size of about 3–12 microns and containing about 1% by weight CdO to inhibit oxidation of the metallic powder;
   b. mixing together said metallic cadmium powder with nickel hydroxide and a cadmium compound powder selected from the group of CdO, $Cd(OH)_2$, and mixtures thereof to form a mixture containing from not more than 34% by weight metallic cadmium, about 0.1–5% by weight nickel hydroxide, about 60–98% by weight cadmium oxide compound;
   c. blending said powder mixture with a binder; and
   d. compressing the mixture on foraminous substrate to form an electrode.

8. The process of claim 7 wherein said cadmium compound has a particle size of about 1 micron.

9. The process of claim 8 wherein said cadmium metal and cadmium compound powder mixture is blended with water and an aqueous dispersion of about 50% by weight fluorocarbons in a ratio of about 2 parts by weight of said dispersion to 99 parts by weight powder mixture to form a slurry; said slurry is spread on a foraminous substrate; and said coated substrate is heated to a temperature not exceeding 200°F. to irreversibly break said dispersion without sintering said fluorocarbon.

10. A method of making an improved rechargeable cell having enhanced anti-fading and energy-density properties comprising:
   a. constructing a positive electrode containing, in an uncharged state, a predetermined amount of electrochemically active material corresponding to the desired capacity of the cell;

b. constructing a cadmium negative electrode by applying to a foraminous substrate a mixture of
  1. generally spherically shaped cadmium metal particles formed by condensing cadmium metal vapors in the presence of oxygen having an average particle size of about 5–10 microns, in an amount sufficient to replenish active negative plate material which may become electrochemically inactive during operation of the cell;
  2. cadmium oxide powder in an amount at least electrochemically equal to or greater than the amount of uncharged positive material;
  3. about 0.01–5% by weight nickel hydroxide; and
  4. a binder;
c. assembling the electrodes together into a container;
d. adding an electrolyte;
e. sealing the container; and
f. thereafter charging the cell.

* * * * *

UNITED STATES PATENT OFFICE
CERTIFICATE OF CORRECTION

Patent No. 3,870,562    Dated March 11, 1974

Inventor(s)   Henry A. Catherino

It is certified that error appears in the above-identified patent and that said Letters Patent are hereby corrected as shown below:

Column 8, lines 10 and 11, should read -- cles formed by condensing cadmium metal vapors in the presence of oxygen having an average particle --.

Column 8, line 47, after "on", insert -- a --.

Issue date should read  -- March 11, 1975 --.

Signed and Sealed this thirtieth Day of March 1976

[SEAL]

Attest:

RUTH C. MASON
Attesting Officer

C. MARSHALL DANN
Commissioner of Patents and Trademarks